United States Patent

Serizawa et al.

[11] Patent Number: 5,254,609
[45] Date of Patent: Oct. 19, 1993

[54] POLYARYLENE SULFIDE RESIN COMPOSITION AND PROCESS FOR THE PREPARATION

[75] Inventors: Hagime Serizawa, Mishima; Hiroyuki Sano, Fuji; Masaru Kubota, Fujinomiya, all of Japan

[73] Assignee: Polyplastics Co., Ltd., Osaka, Japan

[21] Appl. No.: 810,186

[22] Filed: Dec. 19, 1991

[30] Foreign Application Priority Data

Dec. 25, 1990 [JP] Japan .................................. 2-405945

[51] Int. Cl.$^5$ ............................................. C08K 5/15
[52] U.S. Cl. .................................... 524/114; 524/609; 525/420; 525/537
[58] Field of Search .................. 525/537; 524/609, 114

[56] References Cited

U.S. PATENT DOCUMENTS

| | | | |
|---|---|---|---|
| 4,528,346 | 7/1985 | Sugie et al. | 525/523 |
| 4,748,169 | 5/1988 | Izutsu et al. | 524/500 |
| 4,917,957 | 4/1990 | Nitoh et al. | 428/447 |
| 4,929,665 | 5/1990 | Inoue et al. | 525/471 |
| 5,008,342 | 4/1991 | Phadke | 525/286 |

FOREIGN PATENT DOCUMENTS 59-207921 11/1984 Japan .

Primary Examiner—John C. Bleutge
Assistant Examiner—Mark Sweet
Attorney, Agent, or Firm—Depaoli & O'Brien

[57] ABSTRACT

A composition comprising (A) 97 to 20 parts by weight of a polyarylene sulfide resin and (B) 3 to 80 parts by weight of a polyamide resin with (C) 0.1 to 15 parts by weight of a compound having a carbon-carbon double bond and an epoxy group in its molecule and, if necessary, (D) a radical initiator and/or (E) a filler.

14 Claims, No Drawings

POLYARYLENE SULFIDE RESIN COMPOSITION AND PROCESS FOR THE PREPARATION

BACKGROUND OF THE INVENTION

The present invention relates to an improved polyarylene sulfide resin composition and a process for the preparation of the same. More particularly, the invention relates to a polyarylene sulfide resin composition having excellent impact resistance and heat resistance which is prepared by blending a resin component comprising a polyarylene sulfide resin and a polyamide resin with a specific compound and, if necessary, a radical initiator and melt-kneading the obtained mixture.

Recently a thermoplastic resin which has high heat resistance and chemical resistance and excellent flame retardance has been demanded as the material of construction for components of electrical or electronic appliances, automobile parts and chemical instruments. A polyarylene sulfide resin represented by polyphenylene sulfide is one of the resins satisfying this demand. Polyarylene sulfide is relatively inexpensive for its physical properties, so that the demand therefor has increased. However, a polyphenylene sulfide resin has a significant disadvantage in that it is poorer in ductility and is more brittle than other engineering plastics such as nylon, polycarbonate and polybutylene terephthalate.

The addition of a fibrous reinforcement such as glass fiber or carbon fiber or other filler has been known as a means for remarkably improving the resin with respect to various performances such as strengths, stiffness, toughness and heat resistance to overcome the above disadvantage. However, a composition prepared by adding such a reinforcement to a polyarylene sulfide resin is still inferior to other engineering plastics with respect to toughness, so that the application of the composition in various fields is restricted, even though the composition has excellent chemical resistance, heat resistance and flame retardance.

The inventors of the present invention have found that a composition prepared by adding a silane compound having an alkoxysilyl group to a resin component comprising a polyarylene sulfide resin and a polyamide resin exhibits improved impact resistance. As a result, they filed Japanese Patent Application Nos. 320140/1989, 44140/1990, 110839/1990 and U.S. patent application Ser. No. 623,028, filed Dec. 6, 1991 on the basis of this finding. Although the compositions according to these inventions have excellent toughness and impact resistance, the melt viscosity thereof tends to increase causing difficulties during injection molding. Accordingly, a further improvement in this respect has been needed.

SUMMARY OF THE INVENTION

Accordingly, it has been found that a composition exhibiting well-balanced toughness, impact resistance and melt viscosity can be prepared with little increase in melt viscosity by blending a resin component comprising a polyarylene sulfide resin and a polyamide resin with a compound having a carbon-carbon double bond and an epoxy group in its molecule and, if necessary, a radical initiator and melt-kneading the obtained mixture.

DETAILED DESCRIPTION OF THE INVENTION

Specifically, the present invention relates to a polyarylene sulfide resin composition prepared by blending 100 parts by weight of a resin component comprising (A) 97 to 20 parts by weight of a polyarylene sulfide resin and (B) 3 to 80 parts by weight of a polyamide resin with (C) 0.1 to 15 parts by weight of a component having a carbon-carbon double bond and an epoxy group in its molecule, (D) 0 to 20% by weight based on the component (C) of a radical initiator and (E) 0 to 400 parts by weight per 100 parts by weight of the sum of the components (A) and (B) of one or more fillers selected from among fibrous, powdery, flaky and hollow ones, and to a process for the preparation of the polyarylene sulfide resin composition, characterized by kneading a mixture comprising at least the components (A), (B), (C) and, if necessary, (D) under heat melting for at least 30 seconds.

The polyarylene sulfide resin to be used in the present invention as the component (A) is one mainly constituted of repeating units represented by the formula: $-(Ar-S)-$ (wherein Ar is an arylene group).

Examples of the arylene group include p-phenylene, m-phenylene, o-phenylene and substituted phenylene groups (wherein the substituent is an alkyl group preferably having 1 to 5 carbon atoms or a phenylene group), p,p'-diphenylene sulfone, p,p'-biphenylene, p,p'-diphenylene ether, p,p'-diphenylenecarbonyl and naphthalene groups.

Although an arylene sulfide homopolymer constituted of the same repeating units among the arylene sulfide groups described above may be used in the present invention, the use of a copolymer constituted of a plurality of repeating units different from each other is preferable in some cases with respect to the processability of the resulting composition.

In particular, a substantially linear homopolymer composed of p-phenylene sulfide repeating units is preferably used.

The copolymer to be used in the present invention may be any one constituted of two or more repeating units different from each other selected from among the arylene sulfide units mentioned above. Particularly, a copolymer comprising p-phenylene sulfide units as a major component together with m-phenylene sulfide units is preferably used. More particularly, it is suitable with respect to heat resistance, moldability, mechanical characteristics and so on to use a substantially linear copolymer comprising at least 60 mole %, still preferably at least 70 mole % of p-phenylene sulfide units. Further, it is preferable that the copolymer contain 5 to 40 mole %, still preferably 10 to 25 mole % of m-phenylene sulfide units.

Among such copolymers, a block copolymer (for example, one disclosed in Japanese Patent Laid-Open No. 14228/1986) is preferred to a random one, because the former is superior to the latter in processability, heat resistance and mechanical properties.

Although the polyarylene sulfide resin to be used in the present invention as the component (A) may be either a relatively low-molecular weight linear polymer or a polymer having improved processability during molding by crosslinking such a relatively low-molecular weight linear polymer oxidatively or thermally to increase its melt viscosity, the polyarylene sulfide resin may also be a substantially linear high-molecular weight polymer prepared by the polycondensation of a monomer component mainly comprising a difunctional monomer. In many cases, the latter linear polymer is superior to the former with respect to the physical properties of the resulting molded article.

Further, a crosslinked polyarylene sulfide resin prepared from a monomer having at least three functional groups as a part of the monomer component or a blend of the above linear polymer with such a crosslinked polyarylene sulfide resin as well as the polymers described above can be suitably used in the present invention.

The polyamide resin to be used in the present invention as the component (B) includes various known ones. Examples thereof include polyamide resins each prepared by the polycondensation of a dicarboxylic acid such as oxalic, adipic, suberic, sebacic, terephthalic, isophthalic or 1,4-cyclohexyldicarboxylic acid with a diamine such as ethylenediamine, pentamethylenediamine, hexamethylene-diamine, decamethylenediamine, 1,4-cyclohexyldiamine or m-xylylenediamine; those each prepared by the polymerization of a cyclic lactam with a salt of a dicarboxylic acid with a diamine, among which nylons 6, 66 and 12 and copolymers thereof are preferred.

Further, a polyamide elastomer resin can also be used as the component (B). A polyamide elastomer resin is a block copolymer comprising a polyamide hard segment and other soft segment which are bonded to each other, and having a flexural modulus of 10000 kgf/cm$^2$ or below (as determined at 50% relative humidity and 23° C.). The soft segment of such an elastomer resin is representatively polyalkylene oxide (wherein the alkylene group has 2 to 6 carbon atoms). Such a polyamide elastomer resin is generally prepared in two stages, i.e., the formation of nylon oligomer and esterification, though many studies have been reported on the preparation thereof. The polyamide to be used as the hard segment includes polyamides 6, 66, 612, 11 and 12, while the polyether to be used as the soft segment includes polyoxyethylene glycol, polyoxypropylene glycol and polyoxytetramethylene glycol.

The polyamide resin to be used as the component (B) is not limited to only one kind, but a mixture of two or more of them may be used in order to attain the objective physical properties.

According to the present invention, the polyamide resin (B) is used in an amount of 3 to 80% by weight based on the sum of the resin (A) and (B). If the amount of the component (B) is too small, the toughness will not be effectively improved, while if the amount is too large, the advantages due to the polyarylene sulfide resin will be detracted.

The present invention is characterized by using a monomeric compound having a carbon-carbon double bond and an epoxy group in its molecule, for example, an epoxidized vinyl or allyl compound as the component (C). The compound having a carbon-carbon double bond and an epoxy group in its molecule is preferably one having a boiling point of at least 150° C., still preferably at least 200° C. so as not to evaporate away in the melt kneading. Examples of the compound include allyl glycidyl ether, glycidyl acrylate, glycidyl methacrylate, glycidyl vinylbenzoate, glycidyl allylbenzoate, N-[4-(2,3-epoxypropoxy)-3,5-dimethylbenzyl]acrylamide, N-diallylaminoepoxypropane, glycidyl cinnamate, glycidyl cinnamylideneacetate, chalcone glycidyl ether, epoxyhexene, diglycidyl esters of dimer acids and acrylate and methacrylate of epoxidized stearyl alcohol, which may also be used as a mixture of two or more of them. Among these compounds, glycidyl methacrylate, glycidyl vinylbenzoate, glycidyl allylbenzoate, N-[4-(2,3-epoxypropoxy)-3,5-dimethylbenzyl]-acrylamide and N-diallylaminoepoxypropane are particularly preferable.

The component (C) is used in an amount of 0.1 to 15 parts by weight, preferably 1 to 10 parts by weight per 100 parts by weight of the sum of the polyarylene sulfide resin [component (A)] and the polyamide resin [component (B)].

The amount of the component (C) to be added varies depending upon the kind of the component (C) and the desired properties and application field of the resulting composition. When the amount is too small, the dispersion of the components (A) and (B) will not be improved, so that the resulting composition will not have effectively improved toughness and may provide a molded article suffering from unfavorable surface peeling. On the contrary, when the amount is too large, the resulting composition will cause difficulties during molding and processing or bleedout will occur owing to the high melt viscosity which results.

Although the radical initiator (D) is not necessarily an essential component in the composition of the present invention, the addition thereof is preferable for effectively improving the toughness of the composition. Although the radical initiator (D) is not limited at all in so far as it can generate a free radical at a melt-kneading temperature, and may be any one selected from among azo and peroxide initiators, it is suitable to use a radical initiator having a relatively high decomposition temperature, i.e., one having a one-minute half-life temperature of 130° C. or above, preferably 150° C. or above. The radical initiator preferred from this standpoint includes 2,5-dimethylhexane-2,5-dihydroperoxide, di-t-butylperoxide, t-butyl cumyl peroxide, 2,5-dimethyl-2,5-di(t-butylperoxy)hexane, 2,5-dimethyl-2,5-di(t-butylperoxy)hexyne-3, n-butyl 4,4-bis(t-butylperoxy)valerate, 2,3-dimethyl-2,3-diphenylbutane, 2,3-diethyl-2,3-diphenylbutane, 2,3-dimethyl-2,3-di(p-methylphenyl)butane and 2,3-dimethyl-2,3-di(bromophenyl)butane, and which may also be used as a mixture of two or more thereof. The radical initiator (D) is used in an amount of 0 to 20% by weight, preferably 0.1 to 10% by weight based on the compound having a carbon-carbon double bond and an epoxy group in its molecule used as the component (C). Although the amount of the radical initiator to be added varies depending upon the kind of the initiator and the desired physical properties and application field of the resulting composition, the use thereof in too large an amount is unfavorable because the resulting composition will expand during melt kneading.

Although the filler (E) is also not necessarily an essential component in the present invention, the use thereof is preferable for producing a molded article which has excellent mechanical strengths, heat resistance, dimensional stability, electrical properties and other performances. The filler (E) may be selected from among fibrous, powdery, flaky and hollow ones.

The fibrous filler includes inorganic fibrous materials, for example, glass fiber, asbestos fiber, carbon fiber, silica fiber, silica/alumina fiber, zirconia fiber, boron nitride fiber, silicon nitride fiber, boron fiber and potassium titanate fiber, and fibers of metals such as stainless steel, aluminum, titanium, copper or brass. Among them, glass fiber and carbon fiber are most representative. Further, the fibrous filler includes high-melting organic fibrous materials, for example, polyamides, fluororesins and acrylic resins.

The powdery filler includes carbon black, silica, quartz powder, glass bead, glass powder, silicates such as calcium silicate, aluminum silicate, kaolin, talc, clay, diatomaceous earth and wollastonite; metal oxides such as iron oxide, titanium oxide and alumina; metal carbonates such as calcium carbonate and magnesium carbonate; metal sulfates such as calcium sulfate and barium sulfate; silicon carbide, silicon nitride, boron nitride and various metal powders.

The flaky filler includes mica, glass flake and various metal foils. Further, the hollow filler includes "Shirasu" (a white arenaceous sediment) balloon, metal balloon and glass balloon.

It is preferable that these fillers be surface-treated with an organosilane, organoboron or organic titanate prior to the use thereof.

These inorganic fillers may be used alone or as a mixture of two or more thereof. The simultaneous use of a fibrous filler, particularly glass or carbon fiber with a powdery or flaky filler is particularly effective in producing an article which has both excellent mechanical strengths and dimensional accuracy as well as electrical properties.

The amount of the inorganic filler to be used is at most 400 parts by weight per 100 parts by weight of the sum of resins (A) and (B). If the amount exceeds 400 parts by weight, the resulting composition will have poor processability during molding and poor toughness. The use thereof in an amount of 250 parts by weight or below is particularly preferable.

The composition of the present invention may further contain a small amount of another thermoplastic resin as an auxiliary component so long as the use thereof does not deviate from the object of the present invention and examples thereof include polyvinyl chloride resin, polyvinylidene chloride resin, polycarbonate resin, polyester resin, polyolefin resin, and natural and synthetic rubbers. Further, the composition may contain various additives such as flame retardant, antioxidant, ultraviolet absorber, lubricant, mold release agent, nucleating agent, blowing agent, crosslinking agent and/or colorant.

Although the composition of the present invention can be prepared by various known processes, a mixture comprising at least the components (A), (B), (C) and, if necessary, (D) must be heat-melted and kneaded for at least 30 seconds. The component (E) and other components may be added either in this heat melting-kneading step together with the above components or in other steps. For example, the composition can be prepared by homogeneously mixing the components (A), (B), (C) and, if necessary, (D) and (E) together with a mixing machine such as a tumbler or Henschel mixer and melt-kneading the obtained mixture with a single- or twin-screw extruder to obtain pellets. In this preparation, it is preferable to employ a process which comprises preliminarily preparing a solution of the components (C) and (D), adding this solution to the powdery mixture comprising the components (A) and (B), drying the obtained mixture, and subjecting the resulting mixture to the above melt-kneading. This process is particularly effective in homogeneously dispersing the component (D) which is used in a small amount according to the present invention to further improve the toughness. The component (E) may be added either in the course of the melt kneading or thereafter.

The melt-kneading is conducted at a temperature higher than the melting point of the resin component by 5° to 100° C., preferably 10° to 60° C. Melt-kneading at too high a temperature causes decomposition and abnormal unfavorable reactions. Although the melt-kneading time will vary depending upon the kneading temperature or the kind and amount of the component (C) or (D), it is typically 30 seconds to 15 minutes, preferably 1 to 10 minutes.

Although a detailed mechanism as to how the toughness of a resin composition according to the present invention is improved has not been sufficiently elucidated, it is inferred that the polyarylene sulfide resin and the polyamide resin are bonded to each other through the component (C) to improve the compatibility of the both with each other, thus giving a composition having improved toughness with little increase in the viscosity.

As described above, the polyarylene sulfide resin composition of the present invention is characterized in that the dispersion of the constituent components with each other is improved to thereby permit the provision of a molding material having improved toughness and impact resistance with little increase in the viscosity and a molded article having excellent appearance.

EXAMPLES

The present invention will now be described in more detail by referring to the following Examples, although the claimed invention is not to be construed as being limited by them.

EXAMPLES 1 TO 7 AND COMPARATIVE EXAMPLES 1 AND 2

60 parts by weight of a polyphenylene sulfide resin (PPS) (m.p.: 285° C., melt viscosity: 500 P as determined at 310° C. and a shear rate of 1200 sec$^{-1}$) was mixed with 40 parts by weight of a nylon 66 resin. A 20% methanol solution of N-(4-(2,3-epoxypropoxy)-3,5-dimethylbenzyl)acrylamide (C-1) and a 10% acetone solution of 2,5-dimethyl-2,5-di(t-butylperoxy)hexane (D-1) which had been preliminarily prepared were added to the resin mixture prepared above, followed by mixing. The solvents were removed from the obtained mixture, if necessary, followed by the addition of glass fiber (chopped strand having a diameter of 10 μm and a length of 3 mm). The obtained mixture was premixed with a Henschel mixer for 5 minutes and melt-kneaded with an extruder at a cylinder temperature of 310° C. (residence time: about 2 minutes) to give pellets of a polyarylene sulfide resin composition having a formulation specified in Table 1.

The pellets were molded into an ASTM test piece with an injection molding machine at a cylinder temperature of 290° C. and a mold temperature of 150° C. This test piece was subjected to the tensile test and the impact test. Further, the surface of the tensile test piece was observed with the naked eye to evaluate the resistance to surface peeling. Furthermore, the above pellets were examined for melt viscosity at 290° C. and a shear rate of 1200 sec$^{-1}$.

The results are given in Table 1.

TABLE 1

|  | Comp. Ex. 1 | Ex. 1 | Ex. 2 | Ex. 3 | Ex. 4 | Ex. 5 | Ex. 6 | Comp. Ex. 2 | Ex. 7 |
|---|---|---|---|---|---|---|---|---|---|
| Formulation (pts. by wt.) | | | | | | | | | |
| component (A) polyphenylene sulfide resin | 60 | 60 | 60 | 60 | 60 | 60 | 60 | 60 | 60 |
| component (B) nylon 66 resin | 40 | 40 | 40 | 40 | 40 | 40 | 40 | 40 | 40 |
| component (C) C-1 | — | 0.5 | 3 | 10 | 3 | 3 | 3 | — | 3 |
| component (D) D-1 (% by wt. based on the component (C)) | — | 0.5 | 0.5 | 0.5 | — | 5 | 10 | — | 0.5 |
| component (E) glass fiber | — | — | — | — | — | — | — | 67 | 67 |
| Physical properties of the composition | | | | | | | | | |
| tensile strength [kg/cm$^2$] | 648 | 780 | 860 | 870 | 820 | 870 | 870 | 1560 | 2350 |
| tensile elongation [%] | 6 | 36 | 52 | 53 | 48 | 53 | 54 | 1.4 | 6 |
| Izod impact strength [kgf/cm] | | | | | | | | | |
| notched | 2.1 | 3.4 | 5.3 | 5.3 | 4.5 | 5.4 | 5.4 | 5.5 | 13.0 |
| unnotched | 15 | 45 | 87 | 89 | 81 | 90 | 91 | 26 | 57 |
| thermal deformation temperature [°C.] under a load of 18.6 kg | 114 | 110 | 108 | 108 | 108 | 108 | 108 | 253 | 254 |
| melt viscosity [P] | 830 | 1400 | 2000 | 2500 | 1900 | 2000 | 2100 | 2400 | 2800 |
| appearance of molded article | bad | good | good | good | good | good | good | bad | good |

EXAMPLES 8 AND 9 AND COMPARATIVE EXAMPLES 3 AND 4

The same procedure as that of Examples 1 to 7 were repeated except that the PPS resin, nylon 66 resin, C-1 and D-1 were used at a ratio specified in Table 2.

The results are given in Table 2.

TABLE 2

|  | Comp. Ex. 3 | Ex. 8 | Comp. Ex. 1 | Ex. 2 | Comp. Ex. 4 | Ex. 9 |
|---|---|---|---|---|---|---|
| Formulation (pts. by wt.) | | | | | | |
| component (A) polyphenylene sulfide resin | 80 | 80 | 60 | 60 | 40 | 40 |
| component (B) nylon 66 resin | 20 | 20 | 40 | 40 | 60 | 60 |
| component (C) C-1 | — | 3 | — | 3 | — | 3 |
| component (D) D-1 (% by wt. based on the component (C)) | — | 0.5 | — | 0.5 | — | 0.5 |
| component (E) glass fiber | — | — | — | — | — | — |
| Physical properties of the composition | | | | | | |
| tensile strength [kg/cm$^2$] | 650 | 710 | 648 | 860 | 770 | 840 |
| tensile elongation [%] | 2.5 | 33 | 6 | 52 | 20 | 61 |
| Izod impact strength [kgf/cm] | | | | | | |
| notched | 1.6 | 4.1 | 2.1 | 5.3 | 2.9 | 5.7 |
| unnotched | 8 | 67 | 15 | 87 | 18 | 95 |
| thermal deformation temperature [°C.] under a load of 18.6 kg | 115 | 114 | 114 | 108 | 98 | 95 |
| melt viscosity [P] | 670 | 1600 | 830 | 2000 | 850 | 2100 |
| appearance of molded article | bad | good | bad | good | bad | good |

EXAMPLES 10 TO 15 AND COMPARATIVE EXAMPLES 5 TO 10

The same procedure as that of each of the Example 2 and 7 was repeated except that a nylon 6 or 12 or a polyamide elastomer tradename: Daiamide E62, a product of Daicel-Huls Ltd.) was used instead of the nylon 66 resin in a ratio specified in Table 3.

The results are given in Table 3.

TABLE 3

|  | Comp. Ex. 5 | Ex. 10 | Comp. Ex. 6 | Ex. 11 | Comp. Ex. 7 | Ex. 12 | Comp. Ex. 8 | Ex. 13 | Comp. Ex. 9 | Ex. 14 | Comp. Ex. 10 | Ex. 15 |
|---|---|---|---|---|---|---|---|---|---|---|---|---|
| Formulation (pts. by wt.) | | | | | | | | | | | | |
| component (A) polyphenylene sulfide resin | 60 | 60 | 60 | 60 | 60 | 60 | 60 | 60 | 60 | 60 | 60 | 60 |
| component (B) | | | | | | | | | | | | |
| nylon 6 resin | 40 | 40 | — | — | — | — | 40 | 40 | — | — | — | — |
| nylon 12 resin | — | — | 40 | 40 | — | — | — | — | 40 | 40 | — | — |
| polyamide elastomer | — | — | — | — | 40 | 40 | — | — | — | — | 40 | 40 |
| component (C) C-1 | — | 3 | — | 3 | — | 3 | — | 3 | — | 3 | — | 3 |
| component (D) D-1 | — | 0.5 | — | 0.5 | — | 0.5 | — | 0.5 | — | 0.5 | — | 0.5 |

TABLE 3-continued

| | Comp. Ex. 5 | Ex. 10 | Comp. Ex. 6 | Ex. 11 | Comp. Ex. 7 | Ex. 12 | Comp. Ex. 8 | Ex. 13 | Comp. Ex. 9 | Ex. 14 | Comp. Ex. 10 | Ex. 15 |
|---|---|---|---|---|---|---|---|---|---|---|---|---|
| (% by wt. based on the component (C)) | | | | | | | | | | | | |
| component (E) glass fiber | — | — | — | — | — | — | 67 | 67 | 67 | 67 | 67 | 67 |
| Physical properties of the composition | | | | | | | | | | | | |
| tensile strength [kg/cm$^2$] | 615 | 830 | 560 | 705 | 520 | 700 | 1400 | 2100 | 1360 | 1950 | 1620 | 1700 |
| tensile elongation [%] | 8 | 64 | 3.0 | 47 | 12 | 105 | 1.7 | 9.2 | 1.3 | 7.3 | 2.7 | 3.8 |
| Izod impact strength [kgf/cm] | | | | | | | | | | | | |
| notched | 2.7 | 7.5 | 1.7 | 5.2 | 3.7 | 10 | 6.1 | 13.5 | 5.3 | 12 | 6.3 | 15 |
| unnotched | 20 | 105 | 15 | 70 | 28 | 150 | 30 | 70 | 28 | 51 | 33 | 160 |
| thermal deformation temperature [°C.] under a load of 18.6 kg | 109 | 107 | 82 | 81 | 81 | 80 | 247 | 247 | 237 | 236 | 254 | 253 |
| melt viscosity [P] | 820 | 1850 | 780 | 1600 | 640 | 1100 | 2350 | 2700 | 2200 | 2600 | 1900 | 2400 |
| appearance of molded article | bad | good | bad | good | bad | good | bad | good | bad | good | bad | good |

EXAMPLES 16 TO 20

The same procedure as that of Example 2 was repeated except that the "C-1" was replaced by glycidyl methacrylate (C-2) or N-diallylamino-epoxypropane (C-3) and the "D-1" was replaced by 2,5-dimethyl-2,5-di(t-butylperoxy)hexyne-3 (D-2), 2,5-dimethyl-2,5-di(t-butylperoxy)hexane (D-3) or 2,5-dimethylhexane 2,5-dihydroperoxide (D-4).

The results are given in Table 4.

TABLE 4

| | Comp. Ex. 1 | Ex. 2 | Ex. 16 | Ex. 17 | Ex. 18 | Ex. 19 | Ex. 20 |
|---|---|---|---|---|---|---|---|
| Formulation (pts. by wt.) | | | | | | | |
| component (A) polyphenylene sulfide resin | 60 | 60 | 60 | 60 | 60 | 60 | 60 |
| component (B) nylon 66 resin | 40 | 40 | 40 | 40 | 40 | 40 | 40 |
| component (C) | | | | | | | |
| C-1 | — | 3 | 3 | 3 | 3 | — | — |
| C-2 | — | — | — | — | — | 3 | — |
| C-3 | — | — | — | — | — | — | 3 |
| component (D) (% by wt. based on the component (C)) | | | | | | | |
| D-1 | — | 0.5 | — | — | — | 0.5 | 0.5 |
| D-2 | — | — | 0.5 | — | — | — | — |
| D-3 | — | — | — | 0.5 | — | — | — |
| D-4 | — | — | — | — | 0.5 | — | — |
| Physical properties of the composition | | | | | | | |
| tensile strength [kg/cm$^2$] | 648 | 860 | 860 | 850 | 855 | 857 | 856 |
| tensile elongation [%] | 6 | 52 | 52 | 50 | 50 | 51 | 51 |
| Izod impact strength [kgf/cm] | | | | | | | |
| notched | 2.1 | 5.3 | 5.1 | 4.7 | 4.9 | 4.9 | 5.0 |
| unnotched | 15 | 87 | 86 | 84 | 85 | 84 | 85 |
| thermal deformation temperature [°C.] under a load of 18.6 kg | 114 | 108 | 108 | 108 | 108 | 108 | 108 |
| melt viscosity [P] | 830 | 2000 | 2000 | 1950 | 1950 | 1950 | 1800 |
| appearance of molded article | bad | good | good | good | good | good | good |

What is claimed is:

1. A polyarylene sulfide resin composition obtained by melt kneading
   (A) 97 to 20 parts by weight of a polyarylene sulfide resin and
   (B) 3 to 80 parts by weight of a polyamide resin with
   (C) 0.1 to 15 parts by weight of a monomeric compound having an aliphatic carbon-carbon double bond and an epoxy group in its molecule selected from the group consisting of N-[4-(2,3-epoxypropxy)-3,5-dimethylbenzyl]-acylamide and N-diallylaminoepoxypropane,
   (D) 0 to 20% by weight based on component (C) of a radical initiator, and
   (E) 0 to 400 parts by weight per 100 parts by weight of the sum of component (A) and (B) of one or more fillers selected from fibrous, powdery, flaky and hollow ones.

2. A polyarylene sulfide resin composition as set forth in claim 1 wherein said radical initiator as component (D) has a one-minute half-life temperature of 130° C. or above.

3. A polyarylene sulfide resin composition as set forth in claim 2 wherein said radical initiator as component (D) has a one-minute half-life temperature of 150° C. or above.

4. A polyarylene sulfide resin composition as set forth in claim 1 wherein said polyarylene sulfide resin (A) is a homopolymer.

5. A polyarylene sulfide resin composition as set forth in claim 1 wherein said polyarylene sulfide resin (A) is polyphenylene sulfide.

6. A polyarylene sulfide resin composition as set forth in claim 5 wherein said polyarylene sulfide resin (A) is a homopolymer of p-phenylene sulfide units.

7. A polyarylene sulfide resin composition as set forth in claim 5 wherein said polyarylene sulfide resin (A) is a copolymer comprising p-phenylene sulfide units and m-phenylene sulfide units.

8. A polyarylene sulfide resin composition as set forth in claim 7 wherein said polyarylene sulfide resin (A) comprises 60–95 mole percent p-phenylene sulfide units and 5–40 mole percent m-phenylene sulfide units.

9. A polyarylene sulfide resin composition as set forth in claim 1 wherein said polyamide resin (B) is selected from nylon 6, 66, 12 and copolymers thereof.

10. A polyarylene sulfide resin composition as set forth in claim 1 wherein said polyamide resin (B) is a polyamide elastomer.

11. A polyarylene sulfide resin composition as set forth in claim 10 wherein said polyamide elastomer is a block copolymer containing a hard segment selected from nylon 6, 66, 612, 11 and 12 and a soft segment of a polyalkylene oxide wherein the alkylene group has 2 to 6 carbon atoms.

12. A polyarylene sulfide resin composition as set forth in claim 11 wherein said soft segment is formed from polyoxyethylene glycol, polyoxypropylene glycol and polyoxytetramethylene glycol.

13. A polyarylene sulfide resin composition as set forth in claim 1 wherein said component (C) is N-[4-(2,3-epoxypropxy)-3,5-dimethylbenzyl]-acylamide.

14. A polyarylene sulfide resin composition as set forth in claim 1 wherein said component (C) is N-diallylaminoepoxypropane.

* * * * *